United States Patent
Brittan et al.

(10) Patent No.: US 7,373,173 B2
(45) Date of Patent: May 13, 2008

(54) SHARING IMAGE ITEMS

(75) Inventors: Paul St John Brittan, Claverham (GB); Lawrence Wilcock, Malmesbury (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 265 days.

(21) Appl. No.: 10/870,085

(22) Filed: Jun. 16, 2004

(65) Prior Publication Data

US 2004/0263631 A1 Dec. 30, 2004

(30) Foreign Application Priority Data

Jun. 20, 2003 (GB) ................................. 0314438.3

(51) Int. Cl.
*H04Q 7/20* (2006.01)
(52) U.S. Cl. .................. 455/556.1; 455/41.2
(58) Field of Classification Search ..................... None
See application file for complete search history.

(56) References Cited

U.S. PATENT DOCUMENTS

| | | | |
|---|---|---|---|
| 2002/0156875 A1* | 10/2002 | Pabla ......................... 709/220 |
| 2003/0004916 A1* | 1/2003 | Lewis ........................... 707/1 |
| 2004/0109197 A1* | 6/2004 | Gardaz et al. ............. 358/1.15 |
| 2005/0052685 A1* | 3/2005 | Herf et al. .................. 358/1.15 |
| 2005/0071278 A1* | 3/2005 | Simelius ....................... 705/52 |
| 2005/0188399 A1* | 8/2005 | Tischer ........................ 725/34 |
| 2006/0009155 A1* | 1/2006 | Paalasmaa et al. ......... 455/41.2 |

* cited by examiner

*Primary Examiner*—Erika A. Gary

(57) ABSTRACT

The user of a mobile entity with camera functionality uses it to capture an image item which the user then transfers to a networked service system for future access. To facilitate the sharing of the image item with persons who were nearby when the image item was captured, the user uses the mobile entity to form a viewer set of permitted viewers of the image item. The process of forming the viewer set involves the user selection of individuals from a group of persons identified as nearby by a wireless enquiry carried out by the mobile entity contemporaneously with image-item capture. Each viewer in the viewer set is then sent a message with access information for accessing the image item at the service system.

40 Claims, 1 Drawing Sheet

SHARING IMAGE ITEMS

FIELD OF THE INVENTION

The present invention relates to the selective sharing of image items with persons nearby at the time the image item was captured.

As used herein, the term "image item" means an item such as a still photograph or a video or film clip, captured as image data whether in the visible and/or infrared part of the spectrum; other data, such as audio data, may or may not be associated with the image data of an image item.

BACKGROUND OF THE INVENTION

Taking a photograph of a group of people or a scene of interest whilst among friends is a common event and is often followed by a discussion on how best to distribute the photographs. In the modem world of digital image capture and web publishing, images are often uploaded onto web based photo albums and can easily be shared by referencing or following a well known URL combined with some form of access control such as use of a user ID and password. However, at the time of taking a picture, whilst the URL of the album is known and can be passed on, there is no easy way of providing fine-grained access control whereby persons involved in an image just captured can be given access to that image but not to other images in the album.

It is an object of the present invention to facilitate sharing of an image item with persons who were nearby at the time the image item was captured.

SUMMARY OF THE INVENTION

According to one aspect of the present invention, there is provided a method of sharing an image item comprising:
(a) capturing an image item using camera functionality of a mobile entity and transferring the image item to a networked service system;
(b) forming, at the mobile entity, a viewer set of at least one intended viewer of the image item, by a process comprising selection from a group of persons identified by wireless means as nearby contemporaneously with image-item capture in step (a); and
(c) sending to the or each viewer in the viewer set a message with access information for accessing the image item at the service system.

The identification of persons as nearby can relate to the locations of persons just before, at the same time as, or just after the image-item is captured; if this identification does not relate to the locations of the persons at the same time as image-item capture, the time offset from the latter should be sufficiently small that the likelihood of the group of persons nearby changing during the offset is small. As a result, the user of the mobile entity can choose from persons identified as nearby when an image item is taken, who is to be given access to the image item on the service system. It thus becomes possible for even a stranger to be given access rights in a simple manner.

According to another aspect of the present invention, there is provided a mobile entity comprising:
camera functionality for capturing an image item;
a transfer arrangement for transferring the image item to a networked service system;
a viewer-set subsystem for forming a viewer set of at least one intended viewer of the image item, the viewer-set sub-system comprising a wireless transceiver for obtaining information identifying persons nearby contemporaneously with image-item capture by the camera functionality, and a selection arrangement for selecting the viewer set from said persons identified as nearby; and
a message control arrangement for causing a message to be sent to the or each viewer in the viewer set, this message comprising access information for use in accessing the image item at the service system.

BRIEF DESCRIPTION OF THE DRAWINGS

Embodiments of the invention will now be described, by way of non-limiting example, with reference to the accompanying diagrammatic drawing, in which.

BEST MODE OF CARRYING OUT THE INVENTION

Figure 1:
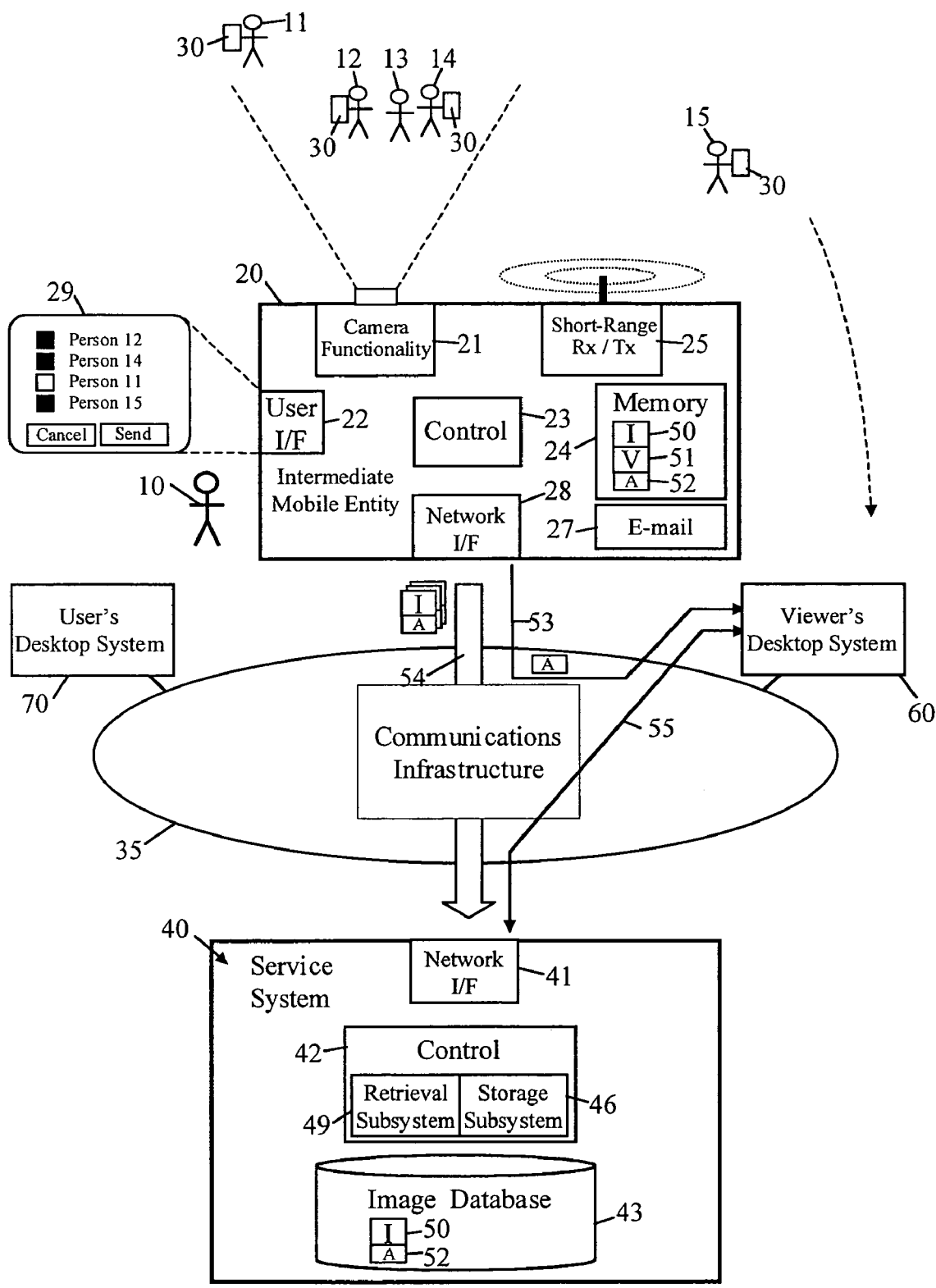
FIG. 1 depicts a mobile entity embodying the invention for capturing an image item and selectively providing nearby persons with access to the item when stored on a networked service system.

With reference to FIG. 1, a user 10 has a mobile entity 20 by means of which the user can capture an image item 50 and send it over a communications infrastructure 35, to an image-item storage service system 40 with which the user is registered. The user 10 can subsequently access the image item 50 stored at the storage service system 40 using, for example, their desktop computer system 70 communicating via the communications infrastructure 35. As will be more fully described below, the embodiment illustrated in FIG. 1 enables the user 10 to provide access to the image item 50 stored at the service system 40 to selected persons identified as nearby when the image item was captured.

The communications infrastructure 35 can be of any suitable form and will typically comprise multiple interconnected networks of various types. For example, the service system 40 can be connected to the public internet with the mobile entity 20 being arranged to communicate with the internet via a PLMN (Public Land Mobile Network) or a wireless LAN (such as an 802.11 network).

The mobile entity 10 comprises camera functionality 21 for capturing image items, a user interface 22 by which the user can control the entity 20 and view images for capture or captured image items, a memory block 24 for storing image items and other data, a control block 23, a short-range transceiver 25 (such as a Bluetooth wireless system or an infrared system), an e-mail subsystem 27, and a network interface 28 for interfacing with the communications infrastructure 35. Typically, the entity 20 will be built around a general purpose processor suitably programmed to provide the processing functions of the foregoing component elements of the entity. The mobile entity 20 is preferably a single device (such as a mobile phone with a built-in camera) but could be composed of multiple interconnected devices (such as a camera connected to a hand-held computing device that has wireless LAN connectivity).

Considering now in more detail the scenario depicted in FIG. 1, in the vicinity of the user 10 there are several other individuals 11 to 15, some of whom are carrying devices 30 that have short-range wireless transceivers compatible with the transceiver 25 of the mobile entity 20. The individuals 12 to 15 are colleagues of the user 10 whereas the individual 11 is not.

The user 10 decides to capture an image item showing three colleagues 12 to 14 using the camera functionality 21 of the mobile entity 20; the individual 11 also appears incidentally in the background. The captured image item 50 is stored, under the control of the control block 23, in the memory 24. At the same time as the image item is captured (for example, triggered by the same user action on a control element of the camera functionality), the short-range transceiver 25 is activated to send out a broadcast enquiry—that is, an enquiry not specific to a particular addressee—asking about who is in the vicinity. In this context, the "vicinity" is determined by the range of the transceiver 25.

The broadcast enquiry is picked up by the devices 30 (assuming they are turned on) which respond, either automatically or only after a confirmatory input from the associated individual, with the identity of the associated individual and the latter's email address. A device 30 can be pre-programmed only to respond automatically to broadcast enquiries from particular parties with enquiries from others either being ignored or brought to the attention of the individual associated with the device.

The responses from the devices 30 are picked up by the transceiver 25 of the mobile entity 20 and a list of the related individuals is displayed to the user 10 via the user interface 22—see the output display depicted at 29 in FIG. 1. In the present example, it is assumed that all devices 30 have responded thereby creating a list of four individuals 11, 12, 14 and 15; individual 13 is not listed as that individual does not have a device 30. The user 10 now uses the user interface to select which of the responding individuals are to be given access to the image item just captured—in this case, the user selects his/her colleagues 12, 14 and 15 (even though the individual 15 was not in the image just captured) but not the individual 11. The selected individuals are the intended viewers of the captured image item and these viewers form a viewer set 51 that is stored in the memory 24 in association with the image item 50. The viewer set 51 contains for each viewer, their identity and e-mail address.

If the user interface 22 has suitable input means, such as a keyboard or voice-input functionality, provision can be made for the user 10 to add one or more additional persons to the viewer set 51 (such as the individual 13 who does not have a device 30).

The control block 23 generates an access code for the captured image item 50 and stores this access code 52 in the memory 24 in association with the image item 50. In the present embodiment, there is a one-to-one relation between the access code and the image item so that the access code is effectively an image-item identifier. The access code is made unique to the image item by, for example, using an equipment identifier that is unique to the mobile entity 20 in combination with an image-item serial number maintained by the mobile entity and incremented each time an image item is captured.

Where the network interface 28 is a wireless interface (for example, an interface to a wireless data network provided by a wireless LAN or a cellular mobile-phone network), the control block 23 of the mobile entity now causes the e-mail subsystem 27 to send (see arrow 53) to each viewer in the viewer set 51, access information for accessing the captured image item once the latter is stored at the service system 40. This access information comprises contact data for contacting the service system (for example, its network address in the form of a URL), and the access code 52 (image-item identifier). At this time, the mobile entity may also send the captured image item 50 and the associated access code 52 to the service system via the interface 28 and the communications infrastructure 35 (see arrow 54). Where the image item 50 and its access code 52 is not transferred at this time, they are subsequently transferred by any suitable means such as, for example, via the user's desktop system 70.

Where the network interface 28 is not a wireless interface, the sending of the emails to the viewers in the viewer set and the transfer of the captured image item and its access code to the service system are deferred until such time as the mobile entity can connect to the communications infrastructure 35.

Of course, the mobile entity need not be provided with a network interface 28 at all; instead, the mobile entity 20 can be provided with an interface to another entity—such as the desktop system 70—that is connected to the communications infrastructure 35. The short-range transceiver 25 could be used for interfacing with the desktop system 70.

The storage service system 40 comprises a network interface 41 for interfacing with the communications infrastructure 35, a control block 42, and an image database 43. The control block 42 comprises an image storage subsystem 46 and an image retrieval subsystem 49, and will generally take the form of a programmed general purpose computer. The service system operates to store respective image-item collections for each of multiple registered users of which user 10 is one.

On receipt of the image item 50 and its access code directly or indirectly from the mobile entity 20, the image storage subsystem 46 stores them in the image database in the image collection associated with the user 10.

The user 10 has unrestricted access to all image items held in their collection at the service system. An individual, such as the individual 15 who has been included in the viewer set associated with the image item 50, can access this image item by using the access information provided in the e-mail (arrow 53) sent to them by the mobile entity 20. Thus, for example, the individual 15 may use their desktop system 60 to connect to the storage service system 40 using the contact data provided in the email and then present the service system with the access code 52 for the image item 50 (see arrow 55). The service system uses the access code as an image-item identifier to retrieve and return a copy of the image item 50 to the individual 15.

Because the individual 11 who responded to the broadcast enquiry made by the mobile entity 20 at the time of capture of the image item 50 was not selected for the viewer set 51 and was therefore not sent an email with the access code for the image item 50, even though the individual may know the contact data for the service system 40, they will not be able to access the image item 50 as they do not know the required access code 52.

Preferably, rather than just relying on a unique access code (image-item identifier) for controlling access to a particular image item amongst all the image items stored in the multiple collections held by the service system, the service system requires the use of a user ID and password to access any particular collection with the access code 52 only being usable once the user ID and password have been accepted. In fact, each registered user advantageously has two pairs of user ID and password, the first pair providing general access to all image items in the user's collection, and the second pair only providing access to image items specifically identified by an access code. In this case, the user 10 would typically keep the first pair private and include the second pair in the access information provided to viewers in viewer sets formed by the mobile entity 20.

It will be appreciated that many variants are possible to the above described embodiments of the invention. For example, the wireless enquiry made by the mobile entity with respect to who is close by can be done just before or just after the image item 50 is captured provided the gap between the two events is sufficiently small that the group of persons nearby is substantially the same at the time of occurrence of each event. Rather than using a short-range transceiver to make the enquiry with the range of the transceiver determining the extent of the area considered to be "nearby", it is possible to make the enquiry on the basis of the actual location of the mobile entity 20 and the devices 30 provided these locations are known or ascertainable. Thus, for example, the mobile entity and the devices may each have a GPS system so that the entity 20 can send out a wireless enquiry by any suitable means that includes information identifying the area in which it is interested, a device only responding if it determines that it is located in that area. In an alternative arrangement, the wireless enquiry is made to a location server (such as one associated with a cellular radio network) that knows, or can ascertain, the location of devices lying within a predetermined area relative to the mobile entity. Furthermore, it is also possible to restrict the area of the enquiry to being generally aligned with the arc of the captured image item; for embodiments that simply broadcast the enquiry by a short range transmitter, this can be achieved by making the broadcast directional in nature whilst for embodiments that rely on location information about the mobile entity and devices 30, the desired effect can be achieved by appropriate specification of the area of interest.

Whilst it will generally be desirable for a device 30 only to give out the identity of the associated individual in response to a specific enquiry (and then only subject to the approval of the individual concerned), it is possible that in some environments, such as an office or at a conference, the device 30 continually broadcasts the identity of the associated individual using short-range transmissions. In this case, the mobile entity can be arranged to keep an up-to-date list of individuals that are nearby simply by arranging for its transceiver 25 to passively listen to the broadcasts and add an individual to the list when a related broadcast is heard; the list would, of course, also need to be purged at regular intervals of individuals that had not been detected within a short preceding period. The current contents of the list so formed could then be presented to the user 10 each time the latter captures an image item.

With regard to the forming of the viewer list by the selection of individuals identified as nearby, this selection can be done automatically according to predetermined criteria rather than directly by the user 10.

Provided the responses from the devices 30 identity the associated individuals adequately, these responses need not include the e-mail addresses of the individuals concerned since such communication details are increasingly available generally. Furthermore, the sending of the access information, including the image-item access code, need not be done by e-mail and could be done, for example, by an SMS message. In fact, any means can be used to send the access information to the or each viewer in the viewer set provided it provides an adequate level of confidentiality for the sensitivity of the image item concerned. Thus including the access information in a message that is sent to a specific destination address may be adequate in many situations whilst in others some encryption, at least of the access code, may be desirable (in the latter case, this can be based on public key cryptography or identifier-based cryptography).

The messages used for sending the access information to the viewers in the viewer set can be sent out by the service system 40 rather than by the mobile entity 20 provided the latter passes the service system the viewer set (including contact data where provided) along with the image item. It is then the responsibility of the service system to generate the associated access code (image-item identifier) and send the access information to the viewers. Alternatively, the mobile entity could still create the access code in which case the viewer set can be sent, along with the access code, separately from the full image (for example, in advance of the sending of the latter) thereby enabling the service system to send the viewer messages before it has received the image item.

Rather than constructing an access code based on a serial number, the access code can simply be formed by a hash of the image item; in this case, the identifier can be separately generated by the mobile entity and service system so that even if the mobile entity sends the access code to the viewers, this code does not need to be sent to the service system. One advantage of using a hash of the image item as the access code is that it enables a viewer to check whether the image item it receives from the service system has the same hash thereby providing a check on whether the image item has been changed since the original hash was computed for the access code. Of course, the hash of the image item can still be included in the messages sending the access information to the viewers even if not used as the image-item access code, thereby enabling the viewers to carry out the foregoing integrity check on the image item provided by the service system.

As an alternative to using access codes, the viewer set 51 can be provided to the service system in association with the image item 50 and the service system arranged to check the identity of a viewer requesting an image item from the service system. Once the viewer has proved their identity to the service system, the latter can then use this proven identity to look up which image items have that viewer in their respective associated viewer sets; these image items, or a viewer-selected subset of them, are then returned to the viewer. Suitable ways for a viewer to prove their identity are well known in the art and include the use of a challenge-response mechanism based on a public/private key pair associated with the viewer.

It is also possible to modify the retrieval arrangement set out in the foregoing paragraph by providing access codes (image-item identifiers) to the viewers, the service system after having confirmed the identity of a viewer, using an access code supplied by the viewer to access the corresponding image item and then return a copy to the viewer but only if the latter is in the viewer set associated with the image item concerned.

Rather than just the captured image item 50 being accessible to the viewers of the associated viewer set 51, the same mechanism as used to give those viewers access to the image item (access code/user ID+password/viewer authentication) can be used to give the same viewers access to all image items in an image set based around the image item 50. More particularly, this image set can be taken to comprise, in addition to the image item 50, any further image item, captured before or after the image item 50, if captured within a specified locality that includes the location at which the image item 50 was captured; the specified locality is, for example, specified by the user 10 in terms of a distance from the location at which the image item 50 was captured. In addition or alternatively, the image set can be taken to comprise, in addition to the image item 50, any further image item captured within a specified time period that includes the time at which the image item 50 was captured; the specified period is, for example, specified by the user 10 relative to the time at which the image item 50 was captured. Rather than the aforesaid specified locality or specified period being related to the image item 50, it can be related to the image item most recently added to the image set; in this way, a progression of image items can be automatically associated together in an image set even though the user has moved a long way from the location at which the image item 50 was captured and/or a long time has passed since the image item 50 was captured.

The image set can be established simply by using the same access code (the one produced for the item 50) with all image items qualifying for the image set or by associating each of these image items with the same viewer set (the one formed for the image 50), depending on the access control mechanism used. The responsibility for this can lie with the mobile entity or the service system. An alternative approach to establishing the image set is to create a corresponding data item listing all the image items in the image set, the access code or viewer set then being associated with this data item. The data item is used by the service system to retrieve image items against a presented access code or associated with a particular viewer.

Where an image set is created, any image item that is not the image item 50 may have its own associated viewer set formed in the same manner as for the item 50; this further viewer set is used to derive viewer access rights (through the sending of access information to the viewers concerned and/or viewer authentication) independently of any access rights arising due to the image-item's membership of the image set. In an alternative arrangement, the viewer set formed in respect of the image item that is not the item 50, can be combined with the viewer set formed in respect of the image item 50 to create an expanded viewer set; access information for the image set is then sent to the or each viewer in the expanded viewer set.

Advantageously, auxiliary information about each image item—such as its location and time of capture—is associated with each image and sent to the server system for subsequent retrieval along with the image item concerned. Where there is a delay in sending a full image item from the mobile entity 20 to the service system (for example, because the user 10 prefers to do this via their desktop system 70 rather than by using a wireless network interface 28), then the auxiliary information can conveniently be transferred via the network interface 28 to the service system 40 at the time of image-item capture in order to serve as a placeholder on the server, either to reserve space and/or to provide any viewer requesting the image item with reassurance that the image item has not been lost. The placeholder information should include some form of data (such as the access code for the image item) for associating the information with the image item concerned. The placeholder information can comprise, in addition or alternatively to the aforesaid auxiliary information, a reduced resolution version of at least a part of the image item.

Provision can be made at the service system for charging a viewer for accessing an image item, this charge being for the benefit of the user 10 and/or the service system.

The invention claimed is:

1. A method of sharing an image item comprising, without regard to order or overlap:
   (a) capturing an image item using camera functionality of a mobile entity and transferring the image item to a networked service system;
   (b) forming, at the mobile entity, a viewer set of at least one intended viewer of the image item, by a process comprising selection from a group of persons identified by wireless means as nearby contemporaneously with image-item capture in step (a); and
   (c) sending, to the or each viewer in the viewer set, a message comprising access information for use in accessing the image item at the service system, wherein identification of the group of persons nearby contemporaneously with image-item capture, is effected by a wireless enquiry sent out by the mobile entity; and wherein said wireless enquiry is such as to restrict said group of persons identified as nearby to persons who lie in the same general direction from the mobile entity as that in which said image item was captured.

2. A method according to claim 1, wherein said wireless enquiry is effected at the same time as the image item is captured.

3. A method according to claim 1, wherein said wireless enquiry is effected by short-range communication between the mobile entity and devices carried by nearby persons.

4. A method according to claim 1, wherein said wireless enquiry comprises the mobile entity asking a location server to identify persons who are currently nearby as indicated by the location of associated mobile devices.

5. A method according to claim 1, wherein the selection from said group is effected by a user of the mobile entity.

6. A method according to claim 1, wherein the selection from said group is effected automatically according to predetermined criteria.

7. A method according to claim 1, wherein said image item captured in step (a) forms a member of an image set to which at least one further image item, captured before or after the first-mentioned image item, is added automatically if captured within a specified locality; said access information sent to the or each viewer in the viewer set being usable for accessing all image items of said image set.

8. A method according to claim 7, wherein said specified locality is specified in terms of a distance from the location at which the first-mentioned image item was captured.

9. A method according to claim 7, wherein said specified locality is specified in terms of a distance from the location at which the image item most recently added to the image set was captured.

10. A method according to claim 7, wherein steps (a) to (c) are repeated in respect of a said further image item whereby to form a further viewer set, independent of that formed for the first-mentioned image item, with the or each viewer in this further viewer set being sent access information independently of the corresponding information sent in respect of the image set that includes the said first-mentioned image item.

11. A method according to claim 7, wherein steps (a) and (b) are repeated in respect of a said further image item whereby to form a further viewer set which is combined with the viewer set for the first-mentioned image item to form an expanded viewer set, said access information being sent to the or each viewer in the expanded viewer set.

12. A method according to claim 1, wherein said image item captured in step (a) forms a member of an image set to which at least one further image items, captured before or after the first-mentioned image item, is added automatically if captured within a specified time period; said access information sent to the or each viewer in the viewer set being usable for accessing all image items of said image set.

13. A method according to claim 12, wherein said specified period is specified relative to the time at which the first-mentioned image item was captured.

14. A method according to claim 12, wherein said specified period is specified relative to the time at which the image item most recently added to the image set was captured.

15. A method according to claim 12, wherein steps (a) to (c) are repeated in respect of a said further image item whereby to form a further viewer set, independent of that formed for the first-mentioned image item, with the or each viewer in this further viewer set being sent access information independently of the corresponding information sent in respect of the image set that includes the said first-mentioned image item.

16. A method according to claim 12, wherein steps (a) and (b) are repeated in respect of a said further image item whereby to form a further viewer set which is combined with the viewer set for the first-mentioned image item to form an expanded viewer set, said access information being sent to the or each viewer in the expanded viewer set.

17. A method according to claim 1, wherein a placeholder for the image item is sent to the service system immediately following capture of the image item, the image item itself being subsequently transferred to the service system.

18. A method according to claim 17, wherein said placeholder comprises a reduced resolution version of at least a part of the image item.

19. A method according to claim 17, wherein said placeholder comprises the time and location of capturing of the image item.

20. A method according to claim 1, wherein in step (c) the or each said message is sent by the mobile entity.

21. A method according to claim 20, wherein the access information comprises contact data for contacting the service system and an identifier of the image item captured in step (a) or of an image set containing that item, the mobile entity providing this identifier to the service system when transferring the image item to the latter.

22. A method according to claim 20, wherein the access information comprises contact data for contacting the service system and a hash of the image item captured in step (a), the method comprising the further step of the service system forming a hash of the image item and using this hash as an identifier by which a said viewer can identify the item for retrieval.

23. A method according to claim 1, wherein in step (c) the or each said message is sent by the service system, the mobile entity providing the service system with the viewer set in association with the image item captured in step (a) or an identifier thereof.

24. A method according to claim 23, wherein the access information comprises contact data for contacting the service system and an identifier of the image item captured in step (a) or of an image set containing that item.

25. A method according to claim 23, wherein the access information comprises contact data for contacting the service system and an identifier of the image item captured in step (a), the identifier comprising a hash of the image item formed by the service system.

26. A method according to claim 1, wherein the access information includes a password.

27. A method according to claim 1, wherein the mobile entity forms a hash of the image item captured in step (a) and sends this hash to the or each viewer in the viewer set, the method further comprising the step of a said viewer using the access information to retrieve the image item from the service system and checking the integrity of the image item so retrieved by forming a hash therefrom and comparing it with the hash received from the mobile entity.

28. A mobile entity comprising:
camera functionality for capturing an image item;
a transfer arrangement for transferring the image item to a networked service system;
a viewer-set subsystem for forming a viewer set of at least one intended viewer of the image item, the viewer-set sub-system comprising a wireless transceiver for obtaining information identifying persons nearby contemporaneously with image item capture by the camera functionality, and a selection arrangement for selecting the viewer set from said persons identified as nearby; and
a message control arrangement for causing a message to be sent to the or each viewer in the viewer set, this message comprising access information for use in accessing the image item at the service system, wherein said wireless transceiver of the viewer-set subsystem is arranged to obtain information about persons nearby contemporaneously with image-item capture, by sending a wireless enquiry; wherein said wireless enquiry is such as to restrict said group of persons identified as nearby to persons who lie in the same general direction from the mobile entity as that in which said image item was captured.

29. A mobile entity according to claim 28, wherein said wireless transceiver of the viewer-set subsystem is arranged to send said wireless enquiry at the same time as the image item is captured by the camera functionality.

30. A mobile entity according to claim 28, wherein said wireless transceiver of the viewer-set subsystem is arranged to effect said wireless enquiry by short-range communication between the mobile entity and devices carried by nearby persons.

31. A mobile entity according to claim 28, wherein said wireless transceiver of the viewer-set subsystem is arranged to effect said wireless enquiry by asking a location server to identify persons who are currently nearby as indicated by the location of associated mobile devices.

32. A mobile entity according to claim 28, wherein the selection arrangement is arranged to enable a user of the mobile entity to select the viewer set from said persons identified as nearby.

33. A mobile entity according to claim 28, wherein the selection arrangement is arranged to select the viewer set, from said persons identified as nearby, automatically and according to predetermined criteria.

34. A mobile entity according to claim 28, wherein the transfer arrangement is arranged to send a placeholder for the image item to the service system immediately following capture of the image item by the camera functionality, the transfer arrangement being arranged to transfer image item itself to the service system at a subsequent time.

35. A mobile entity according to claim 34, wherein said placeholder comprises a reduced resolution version of at least a part of the image item.

36. A mobile entity according to claim 34, wherein said placeholder comprises the time and location of capturing of the image item.

37. A mobile entity according to claim 28, wherein the message control arrangement is arranged to send the or each said message.

38. A mobile entity according to claim 37, wherein the access information comprises contact data for contacting the service system and an identifier of the image item, the transfer arrangement being arranged to provide this identifier to the service system when transferring the image item to the latter.

39. A mobile entity according to claim 37, wherein the access information comprises contact data for contacting the service system and a hash of the image item.

40. A mobile entity according to claim 28, wherein the message control arrangement is arranged to send the viewer set to the service system to cause the latter to send the or each said message.

* * * * *